(12) United States Patent
Proulx

(10) Patent No.: US 8,109,190 B2
(45) Date of Patent: Feb. 7, 2012

(54) RAILGUN SYSTEM

(76) Inventor: George Arthur Proulx, Castro Valley, CA (US)

( * ) Notice: Subject to any disclaimer, the term of this patent is extended or adjusted under 35 U.S.C. 154(b) by 138 days.

(21) Appl. No.: 12/537,482

(22) Filed: Aug. 7, 2009

(65) Prior Publication Data

US 2010/0194212 A1   Aug. 5, 2010

Related U.S. Application Data

(60) Provisional application No. 61/189,834, filed on Aug. 23, 2008, provisional application No. 61/192,602, filed on Sep. 20, 2008, provisional application No. 61/205,263, filed on Jan. 17, 2009, provisional application No. 61/217,340, filed on May 28, 2009.

(51) Int. Cl.
*F41F 1/00* (2006.01)

(52) U.S. Cl. .................. 89/8; 124/3; 310/12.07

(58) Field of Classification Search .............. 89/1.7, 89/8, 14.7, 15, 16; 124/3; 102/501, 517, 102/520–523; 156/172, 173; 310/12.7
See application file for complete search history.

(56) References Cited

U.S. PATENT DOCUMENTS

| | | | |
|---|---|---|---|
| 1,370,200 A | 3/1921 | Fauchon-Villeplee | |
| 1,421,435 A | 7/1922 | Fauchon-Villeplee | |
| 4,430,921 A | 2/1984 | Hughes | |
| 4,467,696 A * | 8/1984 | McNab et al. ............... | 89/8 |
| 4,485,720 A * | 12/1984 | Kemeny ....................... | 89/8 |
| H237 H * | 3/1987 | Levy ............................ | 102/517 |
| 4,658,729 A | 4/1987 | Scherbath | |
| 4,846,911 A | 7/1989 | Tackett et al. | |
| 4,858,511 A * | 8/1989 | Jasper, Jr. ................... | 89/8 |
| 5,076,135 A | 12/1991 | Hurn | |
| 5,202,008 A | 4/1993 | Talieh | |
| 5,237,904 A | 8/1993 | Kuhlmann-Wilsdorf | |
| 5,272,965 A * | 12/1993 | Loffler ........................ | 89/8 |
| 5,283,763 A | 2/1994 | Igenbergs | |
| 5,385,078 A | 1/1995 | Carey | |
| 5,391,275 A | 2/1995 | Mintz | |
| 5,454,289 A * | 10/1995 | Bacon et al. ................ | 89/8 |
| 6,000,479 A | 12/1999 | Ambs | |
| 6,589,407 B1 | 7/2003 | Subramani | |
| 6,725,759 B1 * | 4/2004 | Kathe et al. ................ | 89/8 |
| 7,409,900 B1 * | 8/2008 | Nechitailo et al. ......... | 89/8 |
| 7,503,249 B2 | 3/2009 | Jackson | |
| 7,614,393 B1 * | 11/2009 | Lu ............................... | 124/3 |
| 2006/0243124 A1 | 11/2006 | Jackson | |

OTHER PUBLICATIONS

J.H. Beno et al., "Active Current Management for Four-Rail Railguns", pp. 39-44, IEEE Transactions on Magnetics, vol. 27, No. 1, Jan. 1991, U.S.A.

(Continued)

*Primary Examiner* — Tran Nguyen
(74) *Attorney, Agent, or Firm* — Edward J. Radlo; Radlo IP Law Group

(57) ABSTRACT

A system for accelerating an armature to launch a projectile by injecting liquid aluminum between the armature and a pair of electrically conductive rails. A system for accelerating an armature by injecting liquid metal between the armature a plurality of electrically conductive rails and collecting the liquid metal. The liquid metal or liquid aluminum can comprise solid particles. A railgun structure with mechanical guide rails. A railgun structure with a film stack of alternating copper and nickel layers. An armature with guide rail supports. A method of using the system by placing liquid metal in the armature, placing the armature between conductive rails, and applying an electric current to the rails.

13 Claims, 9 Drawing Sheets

OTHER PUBLICATIONS

Applied Pulsed Power, Inc., "Applied Pulsed Power Solid State Switch Products", pp. 1-3, Jun. 2008, Freeville, New York, U.S.A.

R.L. Ellis et al., "Influence of Bore and Rail Geometry on an Electromagnetic Naval Railgun System", pp. 43-48, IEEE Transactions on Magnetics, vol. 41, 2004, U.S.A.

H.D. Fair, "Advances in Electromagnetic Launch Science and Technology and Its Applications", pp. 225-230, IEEE Transactions on Magnetics, vol. 45, No. 1, Jan. 2009, U.S.A.

Peter Graneau et al., "Railgun Recoil Forces Cannot be Modeled as Gas Pressure", pp. 4570-4571, IEEE Transactions on Magnetics, vol. 33, No. 6, Nov. 1997, U.S.A.

N.C. Jaitly et al., "Long Life Rotating Arc Gap Coaxial Switch for Mega-Amp, Kilo-Coulomb, High Actin Switching of Multi-MJ Capacitor Banks", IEEE, pp. 643-646, 2005, U.S.A.

Jerry F. Kerrisk, "Electrical and Thermal Modeling of Railguns", pp. 399-402, IEEE Transactions on Magnetics, vol. Mag-20, No. 2, Mar. 1984, U.S.A.

Dwight Landen et al., "Eddy Current Effects in the Laminated Containment Structure of Railguns", pp. 150-156, IEEE Transactions on Magnetics, vol. 43, No. 1, Jan. 2007, U.S.A.

J.A. Leuer, "Electromagnetic Modeling of Complex Railgun Geometrics", pp. 1584-1590, IEEE Transactions on Magnetics, vol. Mag-22, No. 6, Nov. 1986, U.S.A.

Chadee Persad, "A Review of U.S. Patents in Electromagnetic Launch Technology", pp. 493-497, IEEE Transactions on Magnetics, vol. 37, No. 1, Jan. 2001, U.S.A.

Quickfield Version 5.7, Finite Analysis System, Tera Analysis, Ltd., Svendborg, Denmark, 2009, http://quickfield.com (last download Nov. 1, 2010).

W.A. Walls et al., "Applications of Electromagnetic Guns to Future Naval Platforms", pp. 262-267, IEEE Transactions on Magnetics, vol, 35, No. 1, Jan. 1999, U.S.A.

Applications of Electromagnetic Guns to Future Naval Platforms, Walls, W.A., Plamer, M., Adams, D., IEEE Transactions on Magnetics, vol. 35, No. 1, Jan. 1999, p. 262-267.

Electromagnetic Launch: A Review of the U.S. National Program, Fair, H. D., IEEE Transactions on Magnetics, vol. 33 No. 1, p. 11-16, Jan. 1997.

Dynamic Response of Electromagnetic Railgun Due to Projectile Movement, Tzeng, Jerome T., IEEE Transactions on Magnetics, vol. 39, No. 1, Jan. 2003.

Elastic Waves in Electromagnetic Launchers, Johnson, A.J. Moon, F.C., IEEE Transactions on Magnetics, vol. 42, No. 3, p. 422-429, Mar. 2006.

Analysis of a Capacitor-Based Pulsed-Power System for Driving Long-Range Electromagnetic Guns, Bernardes, Jack S, Stumborg, Michael F., and Jean, Thomas E., IEEE Transactions on Magnetics, vol. 39, No. 1, Jan. 2003, p. 486-490.

The Current Melt-Wave Model, Woods, L.C., IEEE Transactions on Magnetics, vol. 33, No. 1, p. 152-156, Jan. 1997.

A Thermal Hydraulic Model of Melt-Lubrication in Railgun Armatures, Kothmann, R.E., Stefani, F., IEEE Transactions on Magnetics, vol. 37, No. 1, p. 86-91, Jan. 2001.

Characterization of the Velocity Skin Effect in the Surface Layer of a Railgun Sliding Contact, Engel, Thomas G., Neri, Jesse M. And Veracka, Michael J., IEEE Transactions on Magnetics, vol. 44, No. 7, Jul. 2007, p. 1837-1844.

A Survey of Armature Transition Mechanisms, J. P. Barber, J.P., et al, IEEE Transactions on Magnetics, vol. 39, No. 1, Jan. 2003, p. 47-51.

Railgun Tribology—Chemical Reactions Between Contacts, Persad, Chadee, IEEE Transactions on Magnetics, vol. 43, No. 1, Jan. 2007 p. 391-396.

Railgun Tribology: Characterization and Control of Multishot Wear Debris, IEEE Transactions on Magnetics, vol. 43, No. 1, Jan. 2007, p. 173-177, Persad, Chadee and Castro, Zachira.

Mechanism of Porosity Formation in Transfer Films in Electromagnetic Launchers, Hsieh, Peter Y. et al, IEEE Transactions on Magnetics, vol. 45, No. 1, Jan. 2009 p. 319-321.

Simulation of Liquid Lubricant Injection in Electromagnetic Launcher Armatures, Salant, Richard F. And Wang, Lei, IEEE Transactions on Magnetics, vol. 43, No. 1, Jan. 2007, p. 364-369.

Friction & Wear Under Very High Electromagnetic Stress, Cowan, Richard S., Danyluk, Steven, Moon, Francis, Ford, J. C., Brenner, Donald W., Oct. 2004, Georgia Institute of Technology, Atlanta, GA, USA.

Calculating the Liquid Film Effect on Solid Armature Rail-Gun Launching, Drobyshevski, E.M., Kolesnikova, E.N. and Yuferev, V.S., IEEE Transactions on Magnetics, vol. 35, No. 1, Jan. 1999, p. 53-58.

The Importance of Three Dimensions in the Study of Solid Armature Transition in Railguns, Drobyshevski, E. M., Kurakin, R. O., Rozov, S. I., Zhukov, B. G., Beloborodyy, M. V. and Latypov V. G., Journal of Physics D: Applied Phys. 32 (1999) p. 2910-2917.

Physics of Solid Armature Launch Transition into Arc Mode, Drobyshevski, E. M., Kurakin, R. O., Rozov, S. I., Zhukov, B. G., Beloborodyy, M. V. and Latypov V. G., IEEE Transactions on Magnetics, vol. 37, No. 1, Jan. 2001, p. 62-66.

Analysis of Railgun Barrel Material, Cooper, Khershed P., Jones, Harry N. and Meger, Robert A., IEEE Transactions on Magnetics, vol. 43, No. 1, Jan. 2007, p. 120-125.

Aluminum, Properties and Physical Metallurgy, Hatch, John E., American Society for Metals, 1984, p. 26.

Naval Rail Guns Are Revolutionary, Adams, David Allan, U.S. Naval Institute 2003.

Navy 'Rail Gun' Moves Forward, Bishnoi, Rati, InsideDefense.com, Feb. 2, 2007.

\* cited by examiner

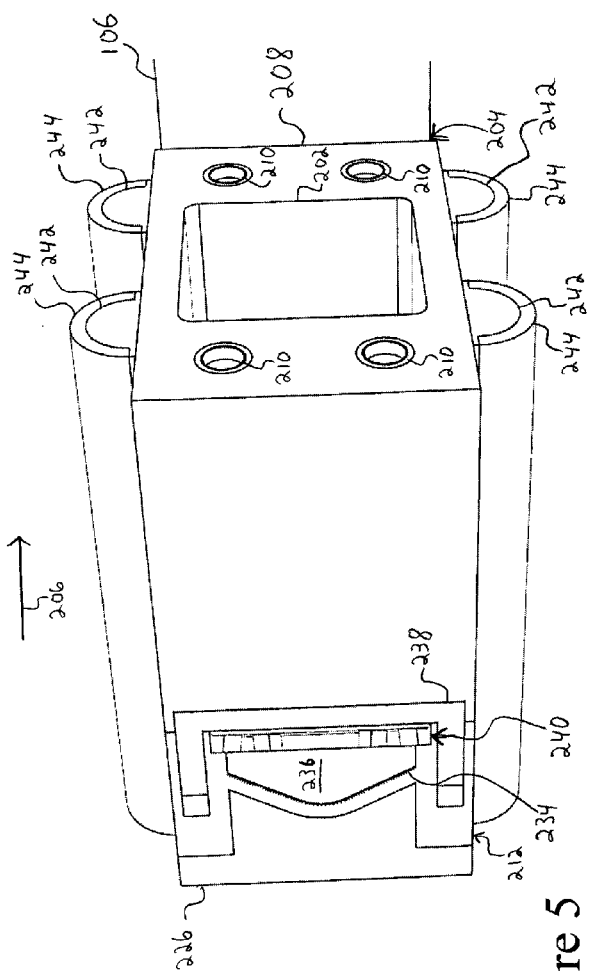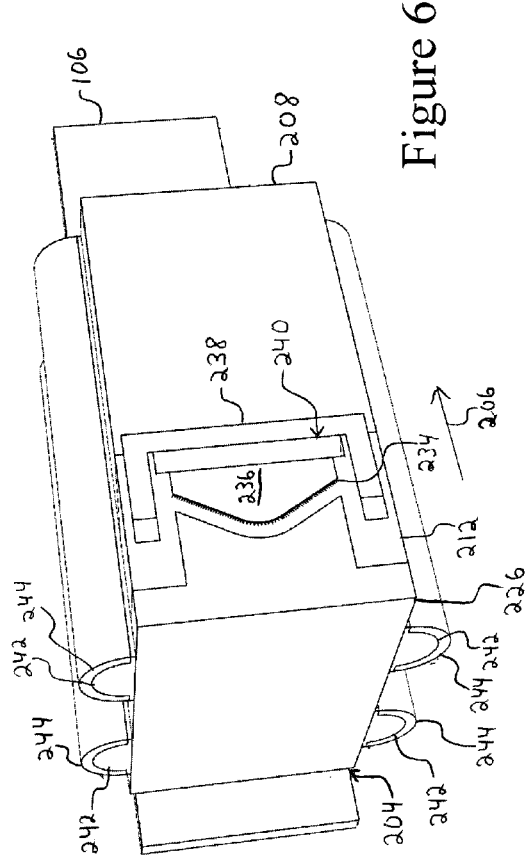
Figure 5
Figure 6

RAILGUN SYSTEM

CROSS-REFERENCE

This application claims the benefit of U.S. Provisional Application No. 61/189,834 filed on Aug. 23, 2008, of U.S. Provisional Application No. 61/192,602 filed on Sep. 20, 2008, of U.S. Provisional Application No. 61/205,263 filed on Jan. 17, 2009, and of U.S. Provisional Application No. 61/217,340 filed on May 28, 2009.

BACKGROUND

Electromagnetic launchers, such as railguns, have received considerable interest due to their ability to accelerate projectiles without use of explosives. A railgun uses the magnetic field between two current-carrying rails to accelerate a current-carrying armature. Railguns are a promising non-explosive projectile launcher and have many potential applications, including mining. For widespread use, a railgun must be economic and powerful.

However, existing systems that can electromagnetically accelerate a projectile suffer from one or more deficiencies, such as rail degradation and less than optimal projectile speed. It is common for a typical railgun system to be unusable after ten to fifty launches due to rail degradation from heat and friction. An increase in launches available from a railgun can significantly lower the cost of launches. Since high projectile speed is important for most railgun applications, improvements to optimize projectile speed also are needed.

Accordingly, there is a need for a railgun system that overcomes one or more of these deficiencies of existing systems.

SUMMARY

The present invention is directed to a system that satisfies this need. In a method of the system, an armature is placed between electrically conductive rails, where there is a gap between at least part of the armature and the rails, electrical current is applied to the rails to accelerate the armature in a forward direction, and liquid metal is introduced into at least a portion of the gap. The liquid metal can be substantially only liquid aluminum or an aluminum alloy, and preferably has a temperature between about 700° C. and about 2200° C. The liquid metal typically is injected near the rear of the armature in the forward direction. Preferably at least some of the introduced liquid metal is collected by the armature.

The liquid metal can be provided in the armature by placing the metal in a container, heating the metal to melt it, and then placing the container in the armature. Alternatively, the metal is heated to melt it, and then it is placed into the container. A third technique is to heat the metal to melt it and then place the liquid metal directly into the armature. The heating can be done with induction heating.

The liquid metal can contain solid particles. The solid particles can have a density close to that of the liquid metal. The solid particles can be a mixture of two materials, one denser than the other, such as carbon and tungsten. The tungsten can be deposited onto the carbon.

An apparatus according to this system suitable for launching a projectile comprises the armature, the electrically conductive rails that form the gap between at least part of the rails and the armature, a source of electricity, electrically conductive liquid metal stored in the armature that comprises at least 90% aluminum, and a port that directs the liquid metal into at least a portion of the gap. There is a gun barrel having a discharge end with a bore containing the conductive rails. The armature has a chamber for containing the liquid metal. The chamber can be lined with corrugated titanium.

When a container is used for the liquid metal, the container is placed in the chamber in the armature. The container preferably is non-electrically conducting, and can be made of quartz or ceramic. The container can optionally have a piston for pressuring liquid metal from the chamber, a discharge opening, and foil across the discharge opening. When the armature is accelerated, the liquid metal breaks the rail and flows out through the discharge opening. The foil is thin enough that pressure from the liquid metal breaks the foil when the armature accelerates. The container can also have multiple liquid metal regions separated by foil and heated to different temperatures.

The armature has a housing that supports a projectile. The armature can also have a backing supported by the rear of the armature that conducts the current between the rails. The backing can be planar. The armature can also have a collector that collects the introduced liquid metal.

The armature port for introducing liquid metal can have one or more injector slots that inject the liquid metal between 10 degrees and 90 degrees relative to the forward direction. Preferably the apparatus includes a stop that prevents the liquid metal from reaching the forward end of the armature. The stop can be made substantially of carbon. The backing and housing can be made of an aluminum alloy while the port can be made of a titanium alloy.

The conductive rails typically are formed of copper or copper alloy. Optionally the conductive rails can have a metallic deposit thereon. The metallic deposit can be one or more layers of a nickel alloy. Alternatively, the metallic deposit can have alternating layers of a copper alloy and a nickel alloy. The layers can have a thickness from around 2μ to around 200μ. The rails can also have a top layer made of an aluminum alloy.

Optionally there are one or more insulators attached to the conductive rails and the gun barrel. Preferably there is a sump at the discharge end of the gun barrel for catching liquid metal.

Preferably there is at least one guide rail in the bore of the gun barrel. The guide rail can be segmented into pieces about 5 mm long with about 1 mm gaps between the pieces. The armature can have guide rail engaging projections to keep the armature on track, and preferably two rail projections on one surface and two projections on the opposed surface. Each projection can be provided with a replaceable buffer element, typically formed of titanium, to avoid wear on the projections and guide rails.

DRAWINGS

These and other features, aspects and advantages of the present invention will become understood with regard to the following description, appended claims, and accompanying drawings where:

FIG. 5 is a front perspective view of the armature of FIG. 3 where the components are assembled together;

FIG. 6 is a rear perspective view of the armature of FIG. 3 where the components are assembled together;

DESCRIPTION

Introduction

According to one embodiment of the present invention, there is provided a system for accelerating an armature for the purpose of launching a projectile.

As used herein, except where the context requires otherwise, the term "comprise" and variations of the term, such as "comprising," "comprises" and "comprised" are not intended to exclude other additives, components, integers or steps. Thus, throughout this specification, unless the context requires otherwise, the words "comprise", "comprising" and the like, are to be construed in an inclusive sense as opposed to an exclusive sense, that is to say, in the sense of "including, but not limited to".

As depicted in the Figures, all dimensions specified in this disclosure are by way of example only and are not intended to be limiting. Further, the proportions shown in these Figures are not necessarily to scale. As will be understood by those with skill in the art with reference to this disclosure, the actual dimensions of any device or part of a device disclosed in this disclosure will be determined by its intended use.

The devices of the present invention and their component parts can be constructed according to standard techniques, as will be understood by those with skill in the art with reference to this disclosure.

Overview

Figure 1:
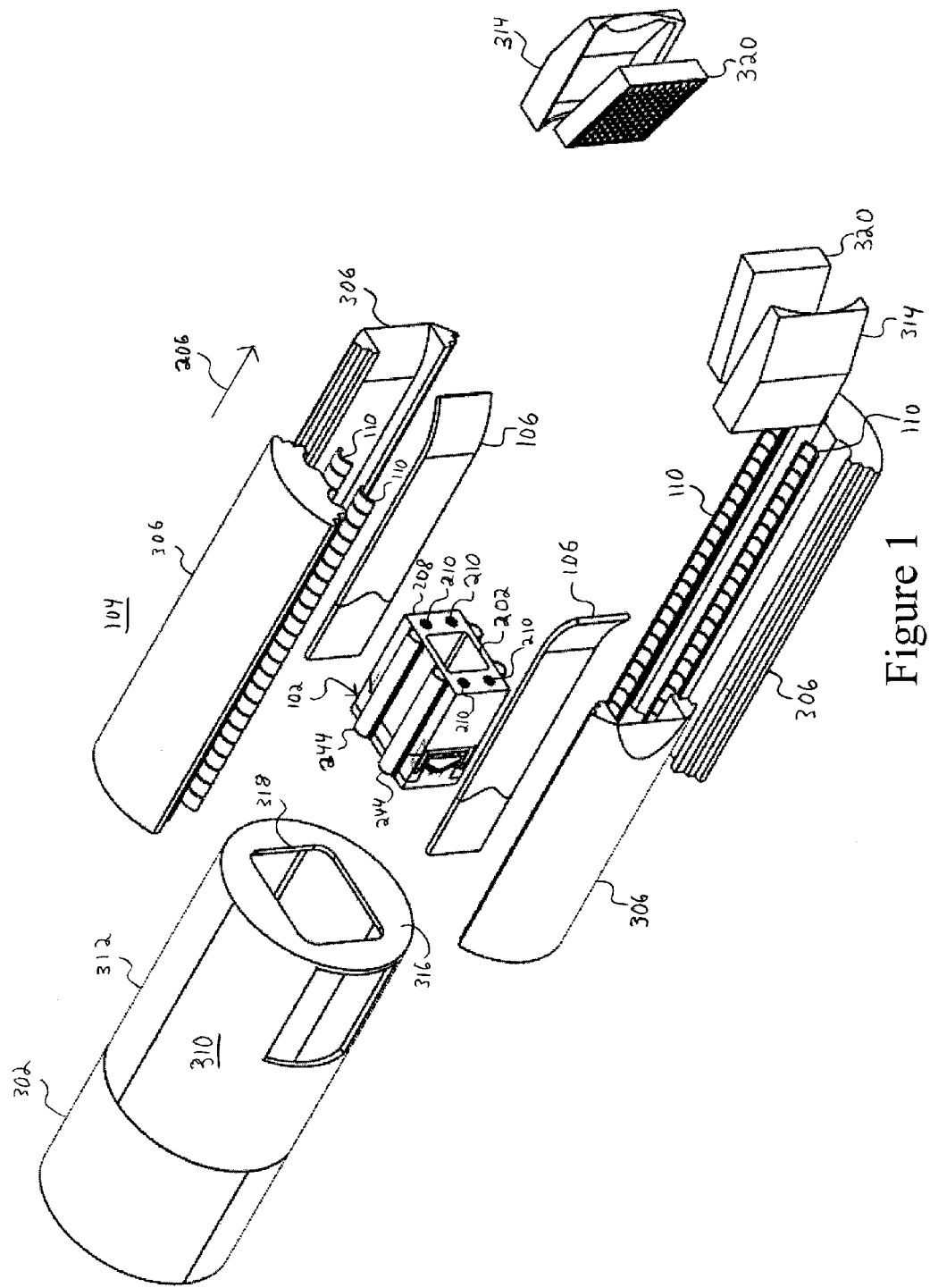
FIG. 1 is an exploded perspective view of a system according to the present invention.
Figure 2:
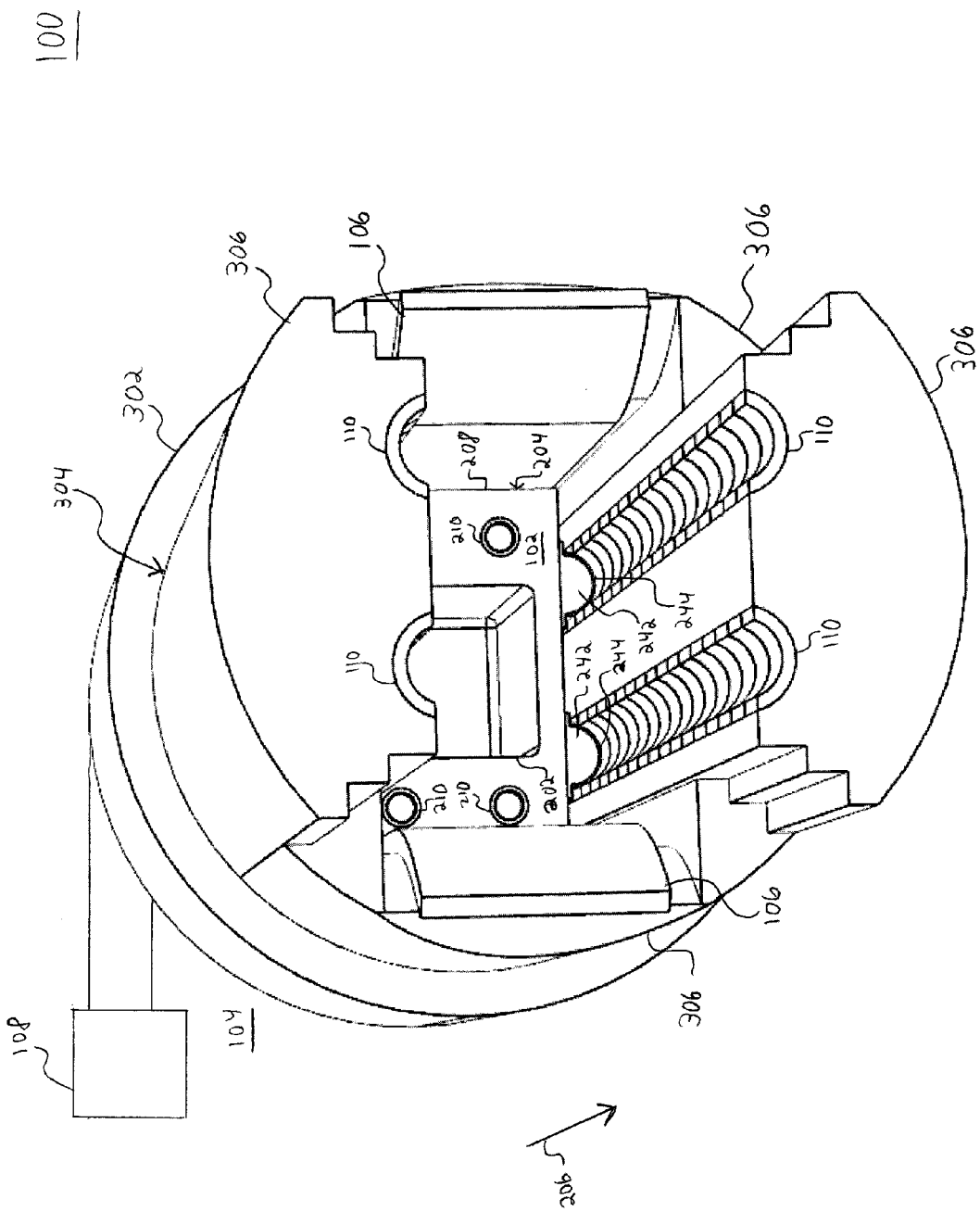
FIG. 2 is a perspective view of the system of FIG. 1 where the components are assembled.

Referring now to FIGS. 1 and 2, a system 100 having features of the present invention comprises an armature 102 for use with a railgun structure 104. The railgun structure 104 comprises parallel electrically conductive rails 106 and an electricity source 108 conductively connected to the electrically conductive rails 106. An electric current is applied in one direction on one electrically conductive rail 106 and in an opposite direction on another electrically conductive rail 106 and therefore there is a magnetic field present between the electrically conductive rails 106. The electrically conductive rails 106 can be made substantially of copper. In a preferred embodiment, the railgun structure 104 further comprises at least one guide rail 110 for stability.

Armature

Referring now to FIGS. 3-6, the armature 102 is configured to support a projectile. The armature 102 has a projectile support such as a bore 202. The projectile can be used for mining. Between the armature 102 and conductive rails 106 is a gap 204. The armature 102 comprises a housing 208 for supporting the projectile, a chamber 210 for receiving electrically conductive liquid metal, and a liquid metal dispensing port 212 for introducing electrically conductive liquid metal into at least a portion of the gap 204. The liquid metal is introduced generally in a forward direction as shown by 206 in FIG. 6. By "forward direction" there is meant the direction the armature 102 is accelerated.

The electrically conductive liquid metal can be at least 90% liquid aluminum. It can be an aluminum alloy, but preferably it is substantially pure aluminum. The liquid metal serves to bridge the gap 204 between the electrically conductive rails 106 and the armature 102 to minimize electrical contact resistance between the armature and the rails. In a preferred embodiment, the electrically conductive rails 106 are first treated with a layer of solid aluminum. With liquid aluminum injected onto the electrically conductive rails 106, there can be an amount of the liquid aluminum that adheres to the electrically conductive rails 106 and an aluminum oxide byproduct residue that forms on this surface. The solid aluminum thickness can vary along the length of the railgun structure 104 and can be at least 10µ thick. The liquid aluminum injected onto the electrically conductive rails 106 can melt the underlying layer of solid aluminum, breaking up any aluminum oxide byproduct residing on top of the solid aluminum. In a preferred embodiment, the injected liquid aluminum is substantially pure.

The liquid aluminum can contain solid particles 214 for assisting in breaking up the aluminum oxide layer. The solid particles 214 preferably have substantially the same density as aluminum. This similar density allows a substantially uniform distribution of the solid particles 214 in the liquid metal. The solid particles 214 can be manufactured from two materials of different density. For example, the solid particles 214 can be made of carbon fibers with tungsten deposits. As carbon fibers have diameters varying from 5µ to 8µ, the tungsten layer is approximately 0.5µ thick to ensure the particles have substantially the same density as liquid aluminum.

The liquid metal dispensing port 212 is in liquid communication with the chamber 210 by a liquid communication conduit 216. Typically the chamber 210 is configured to hold at least 1 kg, typically less than 2 kg, and preferably about 1.4 kg of liquid metal. The housing 208 can be made of aluminum and the chamber 210 is in the housing 208. The chamber 210 can be lined with a material with a high melt temperature, such as corrugated titanium, to directly receive the liquid aluminum. The liquid metal can be heated as it enters the chamber 210, such as through induction heating. The liquid metal can be injected at varying rates of speed as it passes through the induction heater to allow the liquid metal to have a range of temperatures. The chamber can have multiple corrugations for insulating the liquid metal. Alternatively, the chamber 210 can be configured to receive a container 218 that holds heated liquid metal and is made of a material with a melting temperature higher than aluminum, such as quartz or ceramic. The container 218 can receive solid aluminum and then be heated to melt the aluminum. An induction heater, such as a single turn inductive coil having a major axis, can be used to melt the aluminum in the container 218. Preferably, the container 218 is moved through the single turn inductive coil along the major axis from 1 to 2 times until the aluminum melts or is within 100° C. of the melting temperature, which heats the rest of the container 218 and prevents cracking. The container 218 can then be moved through the inductive heater again to fully melt the aluminum. To allow a range of liquid aluminum temperatures, the container 218 can be moved at varying rates of speed through the induction heater, with slower speeds creating hotter temperatures. Liquid aluminum from previous launches can form sediments of uneven thickness on the electrically conductive rails 106. These different temperatures are desirable for more efficiently breaking up the aluminum sediments on different sections of the electrically conductive rails 106. Alternatively, the aluminum can first be heated and then deposited in the container 218.

The melted aluminum is maintained at a temperature ranging from about 700° C. to about 2200° C. While aluminum at temperatures at about 2200° C. is more efficient at transferring heat, the high temperature could cause rail degradation. Typically the melted aluminum is maintained at a temperature ranging from about 700° C. to about 1100° C., and preferably at about 1000° C. The melted aluminum, when introduced into at least a portion of the gap 204, preferably has a temperature less than the melting temperature of the electrically conductive rails 106.

Figure 4:
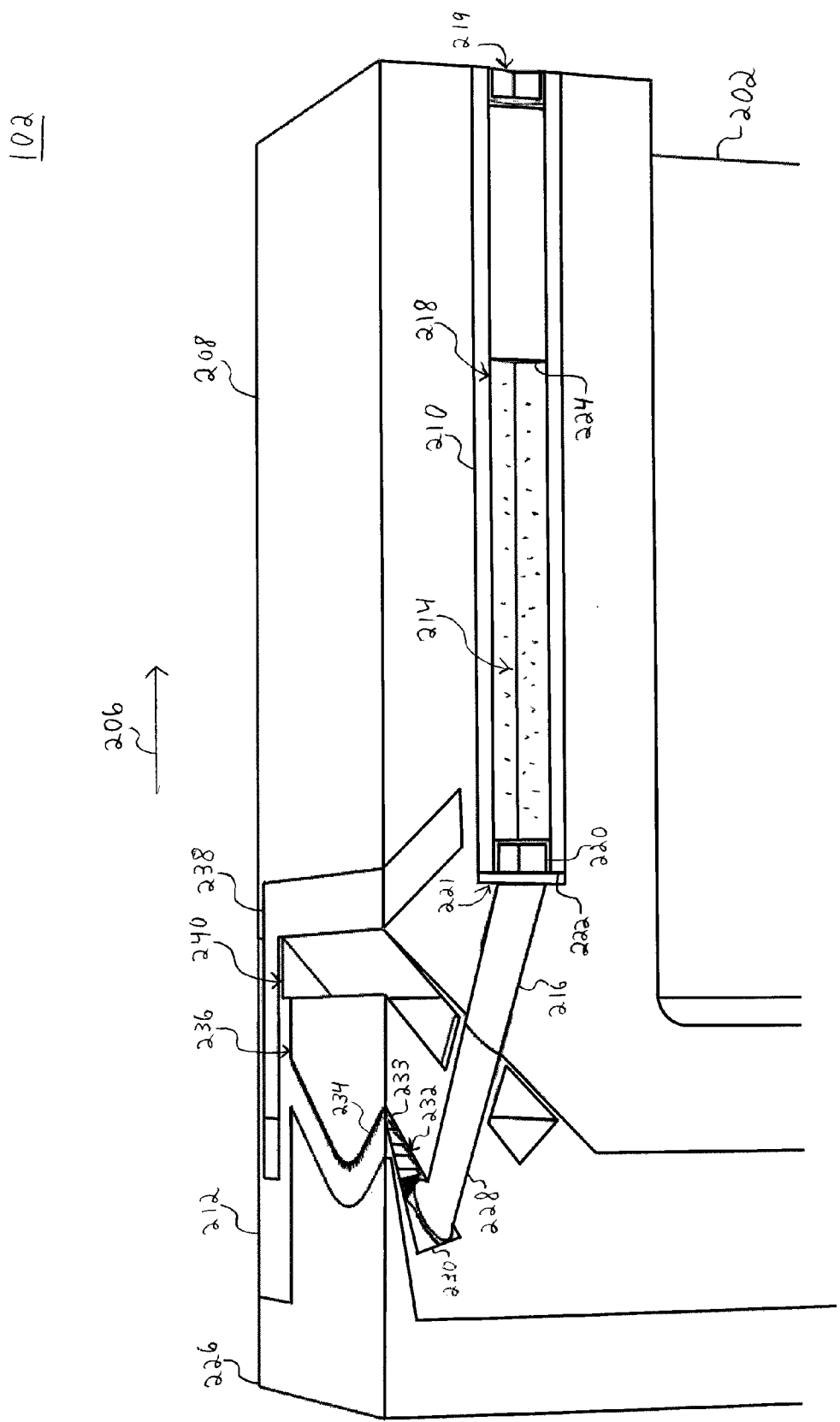
FIG. 4 is a sectional view of the armature shown in FIG. 3 taken on line 4-4 in FIG. 3.

As shown in FIG. 4, the container 218 has a front end 219 and a rear end 221, wherein the front end 219 is sealed and the rear end 221 comprises a discharge opening 220, wherein the discharge opening 220 is covered with a foil 222 having a melting temperature higher than the temperature of the melted aluminum, such as tantalum foil. The container 218 optionally can have a piston 224 located between the liquid aluminum and the front end 219. The piston must have sufficient mass to inject the liquid metal from the port 212 at ballistic speeds. When the armature 102 accelerates in the direction shown by the forward direction 206 arrow in FIGS. 5 and 6, the piston 224 is forced towards the rear end 221 of the container 218 by its own inertia. The piston's movement forces the liquid aluminum towards the rear end 221 of the container 218, breaking the foil 222 and allowing the liquid aluminum to move towards the dispensing port 212 through the liquid communication conduit 216.

Instead of a single chamber for the aluminum, there can be multiple chambers, such as four chambers 210, each chamber 210 holding a container 218 of liquid aluminum. Optionally, each container 218 is provided with one or more thin and semi-insulating foils for insulating regions of liquid aluminum from each other. The thin and semi-insulating foils can be made substantially of tantalum. The thin and semi-insulating foils serve to separate sections of the liquid aluminum that have different temperatures and are configured to break as the armature 102 accelerates. The liquid aluminum proximal to the rear end 221 of the container 218 can be hotter than the liquid aluminum proximal to the front end 219 of the container 218.

The armature 102 can have a conductive backing 226 made of electrically conductive material such as aluminum. The backing 226 can be attached to the rear of the dispensing port 212 and can be 4 cm thick. The backing 226 conducts electric current between the electrically conductive rails 106. Electric current flows from one electrically conductive rail 106 through the liquid metal to the backing 226 and to the other electrically conductive rail 106 through liquid metal. Preferably, the backing 226 has at least two opposed, longitudinal surfaces parallel to the electrically conductive rails 106 and one lateral surface connecting the two longitudinal surfaces. Electric current travels from the electrically conductive rails 106 through the liquid metal to one longitudinal surface. The current traveling on the longitudinal surface moves in a direction 180 degrees from the forward direction 206. The current moving in this direction helps to maintain the gap 204 between the electrically conductive rails 106 and the armature 102 through the Lorentz force. The current then travels along the lateral surface in a direction 90 degrees from the forward direction 206. The current then travels along the other longitudinal surface in the forward direction 206. The current moving in this direction also helps to maintain the gap 204. In a preferred embodiment, the backing 226 is substantially planar. The planar design serves to maximize Lorentz force in the forward direction 206 and not toward the electrically conductive rails 106, thereby optimizing the speed of the armature when it is accelerated.

The dispensing port 212 delivers the liquid metal into at least a portion of the gap 204, causing a circuit bridge between the electrically conductive rails 106 and the armature 102. In a preferred embodiment, the dispensing port 212 comprises a delivery channel 228 in liquid communication with the liquid communication conduit 216, a manifold area 230 in liquid communication with the delivery channel 228, and an injector slot 232 in liquid communication with the manifold area 230 and the gap 204. Liquid aluminum flows from the chamber 210 via the delivery channel 228 to the injector slot 232 through the manifold area 230. The injector slot 232 can have a plurality of struts 233. The struts 233 can be machined using standard electrical discharge machining (EDM) techniques. The struts 233 are angled to direct the liquid metal at an angle relative to the forward direction 206 toward the nearest electrically conductive rail 106. The angle can be from 10° to 90°, and preferably is 30°. The struts 233 have ends 234 near the gap 204, and the ends 234 form a line referred to as the "injector length" having two ends. The struts 233 can each have a second angle relative to the forward direction 206 toward the center of the injector length. The second angle can vary by strut 233 and can be proportional to the distance of the strut 233 to the center of the injector length. The second angle can be as high as 50° relative to the forward direction 206 toward the center of the injector length for struts at the ends of the injector length. The injector length can be curved to allow a larger volume of liquid metal into the gap 204 than if the injector length were straight. In a preferred embodiment, the struts 233 have a height between 25μ and 125μ near the gap 204, such as 100μ. Preferably, the struts 233 also have a thickness from about 0.1 mm to about 1 mm and are spaced from about 2 mm to about 10 mm apart.

The dispensing port 212 optionally can include a heat conduction region 236 for breaking up solid aluminum sediments on the electrically conductive rails 106. The heat conduction region 236 allows for a temporary deposit of liquid metal to ensure a relatively constant amount of liquid metal in contact with the electrically conductive rails 106 and the armature 102. The heat conduction region 236 is located in front of the injector slot 232 proximal to the strut ends 234 and can be a depression from about 1μ deep to about 150μ deep.

Figure 3:
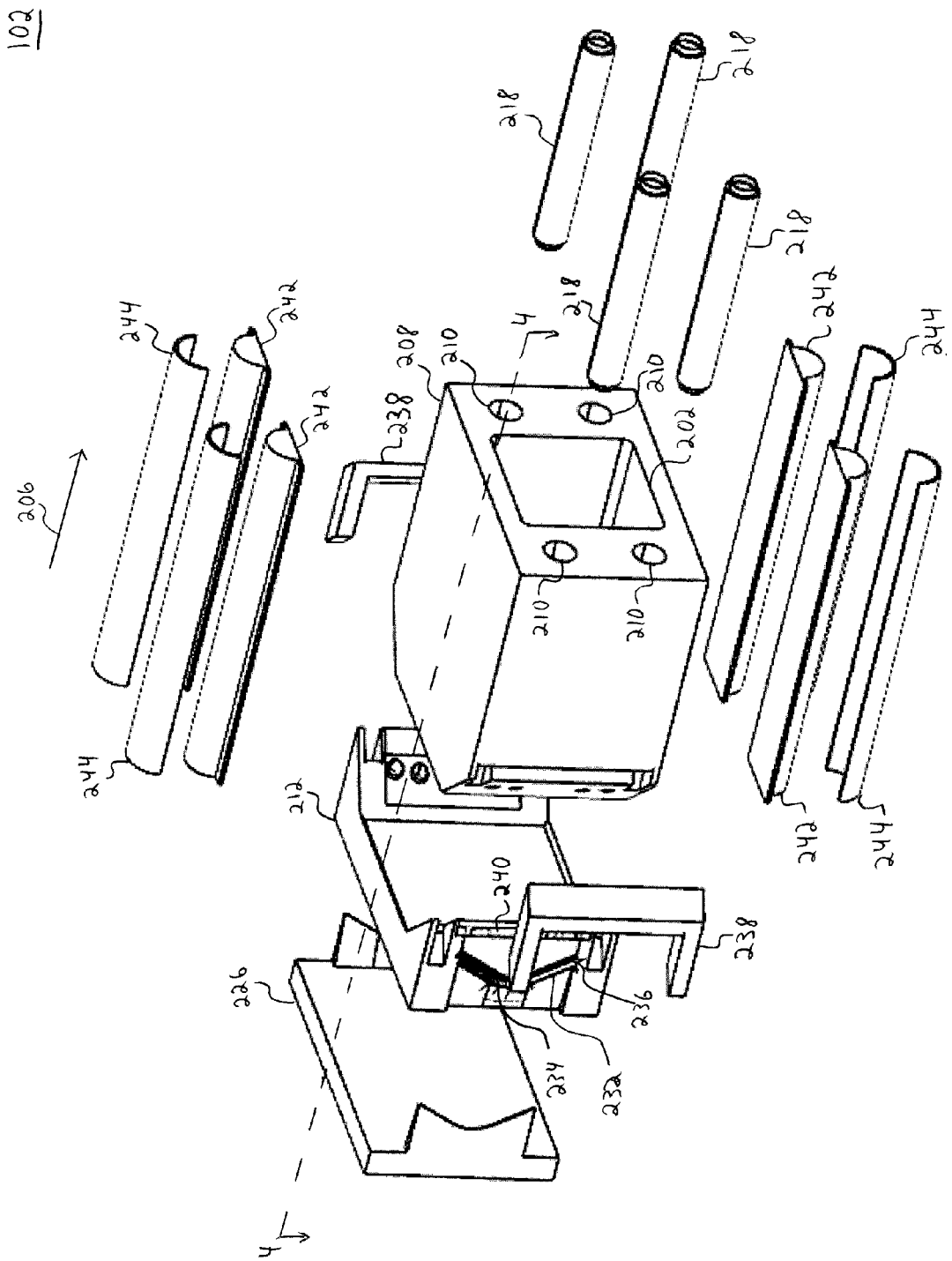
FIG. 3 is an exploded perspective view of an armature for use in the system of FIG. 1.

In a preferred embodiment as shown in FIGS. 3 and 4, the armature 102 has a stop 238, which can be made of carbon, such as graphite, to prevent injected liquid metal from traveling forward to the housing 208. Carbon is preferable as it creates micron level contact with the electrically conductive rails 106. The stop 238 can be flush with the electrically conductive rails 106 to block the liquid metal. Typically, the stop 238 is embedded in the housing 208 and installed at an angle from about 95° to about 135° relative to the forward direction 206. The stop 238 can have a width from about 1 cm to about 5 cm and a thickness from about 1 cm to about 5 cm. As the armature 102 accelerates, the stop 238 wears down due to friction with the electrically conductive rails 106. The thickness from about 1 cm to about 5 cm means the stop 238 does not completely disintegrate in one launch. The stop 238 preferably has one or more arms oriented 180° relative to the forward direction. The arms preferably extend to the injector length to prevent liquid metal from traveling above or below the armature 102.

Preferably, the armature 102 has a collector 240 for collecting spent liquid metal. The spent liquid metal resides in the collector 240 and exits the system 100 with the armature 102. The collector 240 and the dispensing port 212 can be a unitary unit, made of a material with a higher melt temperature than aluminum, such as titanium or a titanium alloy. In a preferred embodiment, the collector 240 is located in front of the injector slot 232 and just behind the stop 238. Liquid metal flows from the heat conduction region 236, and the stop 238 forces the liquid metal to the collector 240 as there is nowhere else for the liquid metal to go. In a preferred embodiment, the distance between the injector slot 232 and the collector 240 is at least 2 cm. In another preferred embodiment, the volume of the collector 240 is greater than the volume of the liquid metal so that all of the dispensed liquid metal can be collected.

The armature 102 can have one or more guide rail engaging projections 242 designed to fit into a corresponding guide rail 110 to help maintain the armature traveling in the forward direction 206. In a preferred embodiment, the armature 102 further comprises at least one replaceable buffer 244 attached to each projection 242 and located proximal to the guide rail 110 to prevent wear of the guide rails 110 and the projections 242. The buffer 244 can be made of a titanium alloy and can be from about 2 mm thick to about 4 mm thick.

Railgun Structure

Figure 7:
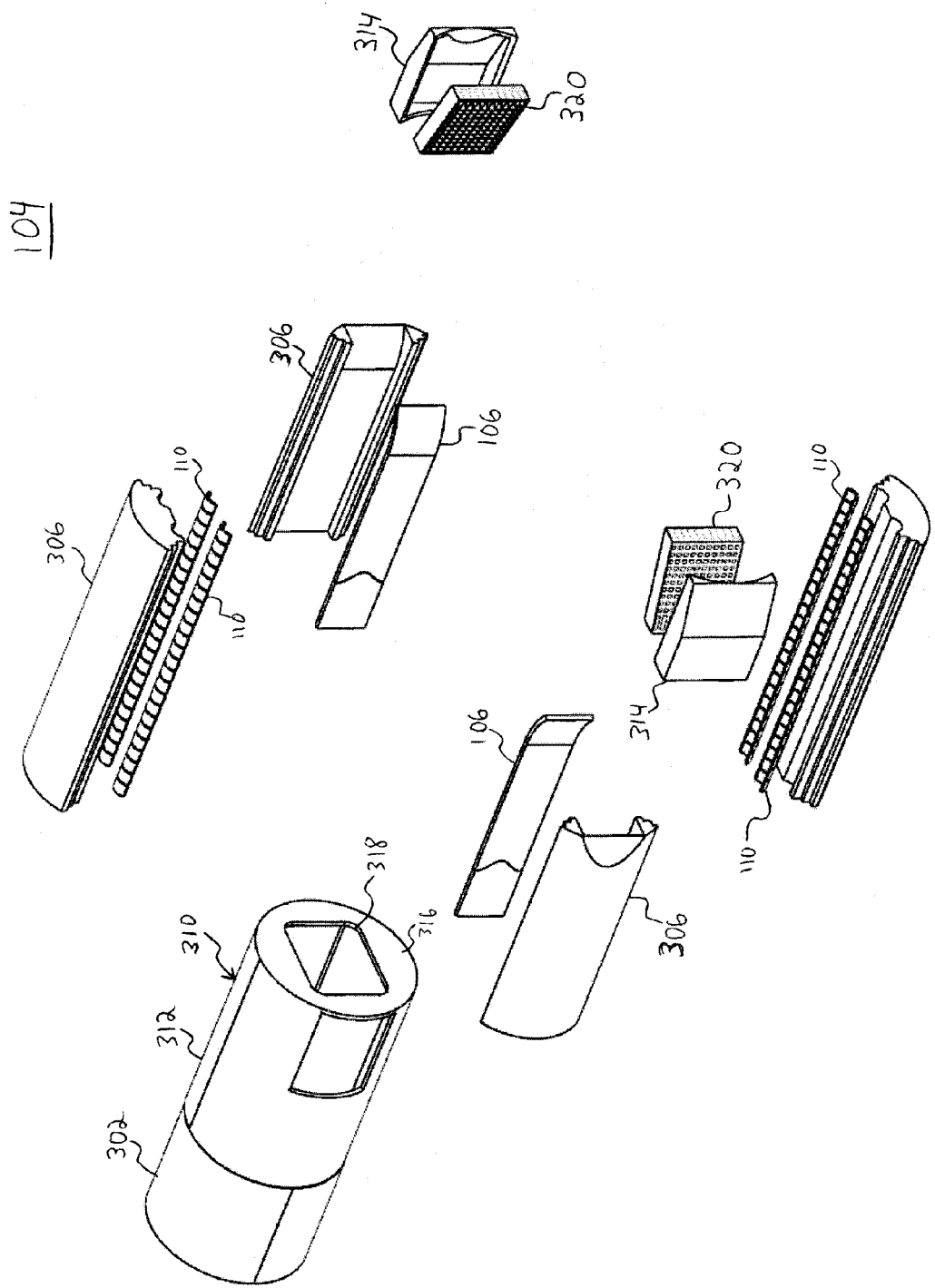
FIG. 7 is a perspective exploded view of the gun bore and rail components of the system of FIG. 1.
Figure 9:
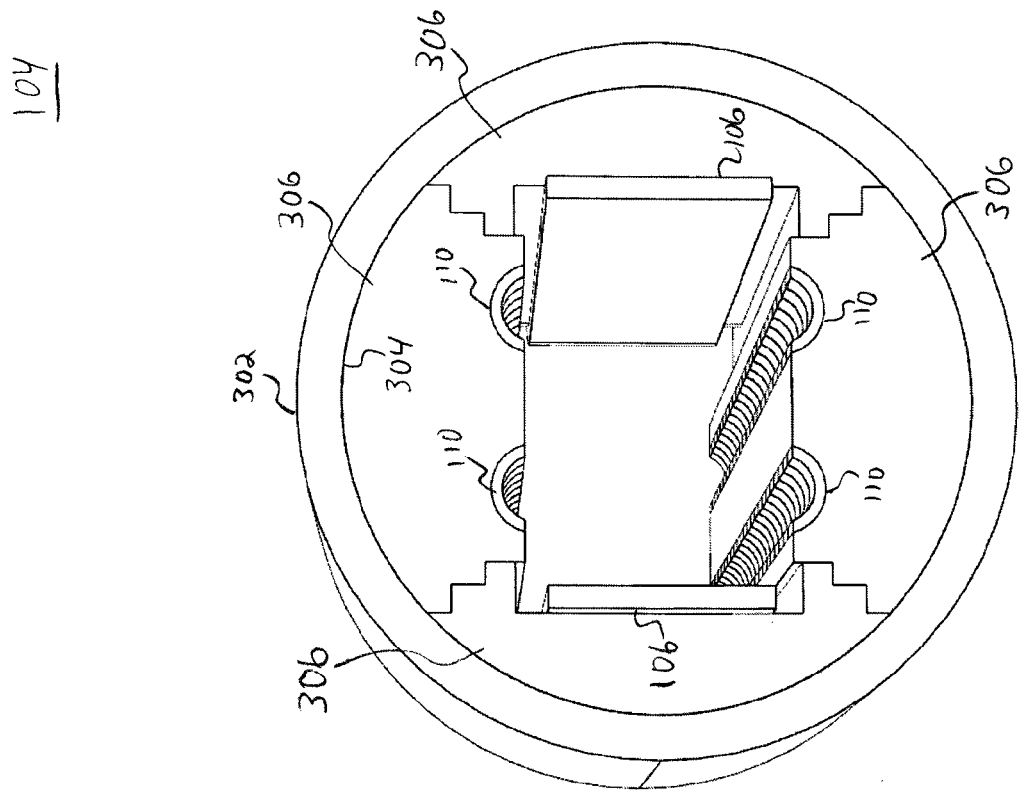
FIG. 9 is a perspective view, partly in section, of the gun bore according to the present invention of FIG. 1.
Figure 8:
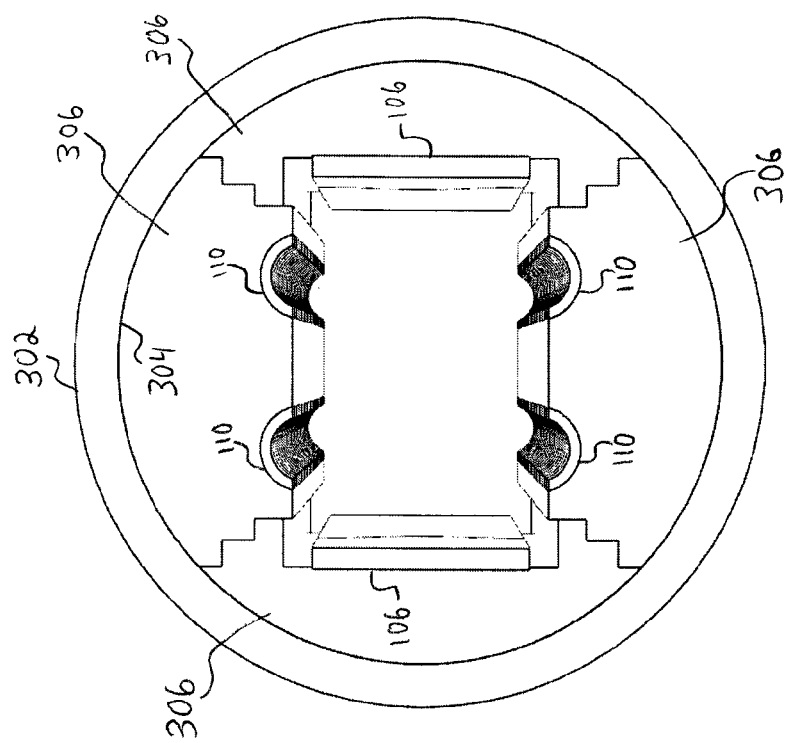
FIG. 8 is a front elevation view, partly in section, of a gun bore with associated rails of the system of FIG. 1.

The railgun structure 104 can especially be seen in FIGS. 7-9. The electricity source 108 provides electric current in one direction along one rail 106 and in another direction along the other rail 106. The electrically conductive rails 106 can be 16 cm wide and 3 cm thick. The parallel electrically conductive rails 106 form a plane, and the electric current from the electricity source 108 causes a magnetic field between the two rails pointed into the plane between the electrically conductive rails 106.

Preferably the electrically conductive rails 106 have a metallic deposit to prevent deformation or erosion from the hot liquid aluminum. The metallic deposit can be made from a single layer of a deposit metal from 2µ to 200µ thick, and preferably is 100µ thick. Alternatively the metallic deposit can be a plurality of layers, wherein the layers alternate between a deposit metal and copper. The deposit metal preferably has a thermal expansion coefficient similar to that of the metal used for the electrically conductive rails 106, a melt temperature above the melt temperature of the metal used for the electrically conductive rails 106, a thermal diffusion coefficient lower than that of the metal used for the electrically conductive rails 106, a surface hardness greater than that of copper, and an atomic diffusion into aluminum lower than the metal used for the electrically conductive rails 106 into aluminum. The deposit metal can be nickel or nickel alloy. Each layer has a thickness between about 2µ and 200µ, and the outermost layer is nickel or nickel alloy. Preferably the outermost layer is 100µ thick. The number of alternating layers in the stack can range from one pair to about five pairs. The metallic deposit can be attached to the electrically conductive rails 106 using standard electroplating technology as developed for the electronics industry.

In a preferred embodiment, the electrically conductive rails 106, with or without the deposit materials, are coated with solid aluminum during manufacture to ensure the copper-aluminum interface is an oxide-free inter-metallic bond. The aluminum is the outermost layer of the electrically conductive rails 106. This can be done with standard metallurgical techniques, such as electroplating followed by a heat cycle.

In a preferred embodiment, the railgun structure 104 comprises a gun barrel 302 having an inner surface 304, and at least one insulator 306 attached to the inner surface 304 of the gun barrel 302 and to the electrically conductive rails 106. The gun barrel 302 can be about 12 cm thick, 12 m long, and can be made from a non-conducting material. The gun barrel 302 can have an inner diameter of about 60 cm. The non-conducting material can be a glass fiber winding with an electrically insulating adhesive to bind the glass together, such as polyaryletheretherketone (PEEK) or epoxy. The glass fiber windings can be preloaded. The insulator 306 can be made of a dielectric material, such as ceramic, silicon carbide, or glass fiber held together with PEEK or epoxy. Alternatively, the gun barrel 302 can be preloaded with an inflatable bladder according to Jackson et al. in U.S. Pat. No. 7,503,248. The electrically conductive rails 106 have an acceleration surface direction pointed away from the insulator 306.

With reference to FIG. 9, the railgun structure 104 preferably further comprises at least one guide rail 110 attached to the gun barrel 302. The guide rail 110 is configured to fit with the rail support 242 on the armature 102 and can be attached to an insulator 306, wherein the insulator 306 is attached to the inner surface 304 of the gun barrel 302. The insulator 306 can be made of a dielectric material, such as ceramic, silicon carbide, and glass fiber held together with PEEK or epoxy. The guide rail 110 can comprise a plurality of segments about 5 mm long and spaced apart from each other from about 0.5 mm to about 1 mm. The guide rail 110 can be made of hardened steel or tungsten alloy and can be from about 1 cm thick to about 2 cm thick. Preferably the electrically conductive rails 106 in the gun barrel 302 are at about 0° and 180°, with a first guide rail 110 at about 90°, and a second guide rail 110 at about 270°. Optionally, the railgun structure 104 can further have a third guide rail 110 proximate to the first guide rail 110 and a fourth guide rail 110 proximate to the second guide rail 110, with the armature 102 having four guide rail engaging projections 242, each corresponding to a respective guide rail 110.

Figure 10:
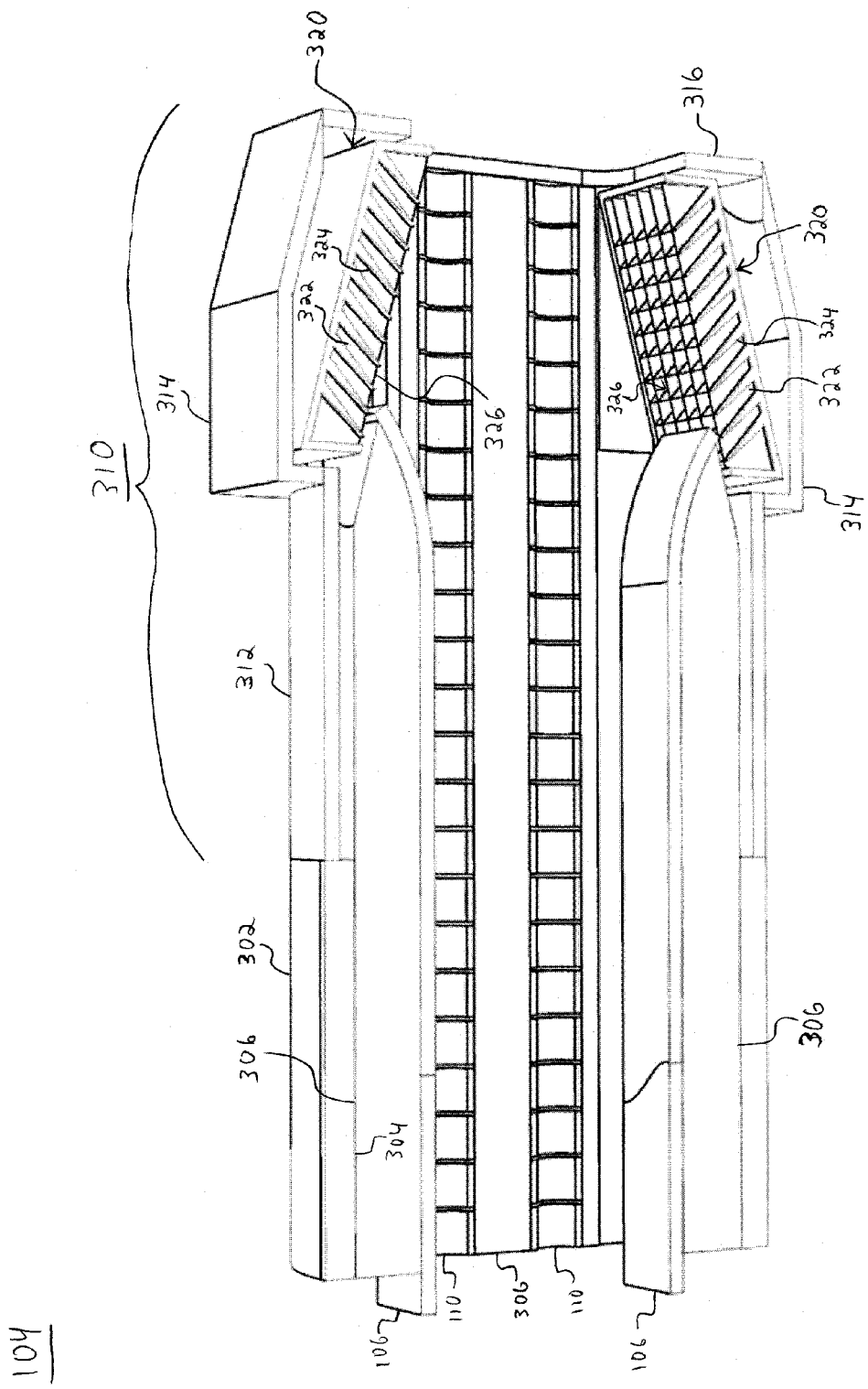
FIG. 10 is partial longitudinal sectional view of the gun bore according to the present invention of FIG. 1 depicting the exit cavity.

The railgun structure 104 can include an exit cavity 310 attached to the front of the gun barrel 302 as shown in FIG. 10 for preventing a flash when a projectile exits the gun barrel 302. The exit cavity 310 is configured to contain any remaining amount of injected liquid metal. The electrically conductive rails 106, insulators 306, and guide rails 110 protrude out of the gun barrel 302 and into at least a portion of the exit cavity 310. The exit cavity 310 comprises an insulating barrel 312, a removable attachment 314 designed to connect to the insulating barrel 312, a cover 316 attached to the front of the insulating barrel 312 with a hole 318 in the middle of the cover 316 at least the size of the armature 102, and a sump 320 attached to the removable attachment 314. Preferably, the guide rails 110 and the insulators 306 attached to the guide rails 110 extend up to the cover 316 to guide the armature through the length of the exit cavity 310. The insulating barrel 312 is from about 100 to about 200 cm long and about 12 cm thick. The attachment 314 is from about 50 to about 100 cm tall, from about 20 cm to about 40 cm long, about 10 cm thick, and is at least as wide as the armature 102 is tall. Preferably, at least part of the attachment 314 is angled towards the hole 318 in order to angle the sump 320, allowing the sump 320 to catch more incident liquid metal. The attachment 314 is designed to be removable to facilitate replacing the sump 320 without disassembling the entire exit cavity 310. The attachment 314 and insulating barrel 312 can be made of an insulator, such as wound glass fiber held together with PEEK or epoxy. The electrically conductive rails 106 can be angled towards the insulating barrel 312 to taper off the electric current and preferably extend to at least the back of the sump 320 so liquid metal is incident only on the sump 320. When there is insufficient electric current going through the armature 102, the magnetic field between the electrically conductive rails 106, and thus the acceleration of the armature 102, terminates. Some liquid metal may continue to exit the armature 102 due to residue pressure on the liquid metal in the chamber 210, albeit much less than while accelerating. In addition, there may be some remaining liquid metal in the gap 204 and the heat conduction region 236. This liquid metal is incident on the sump 320.

The sump 320 can be made from the same metal as the incident liquid metal. The sump 320 can have a length and width substantially the same as the length and width of the attachment 314, and a thickness from about 30 cm to about 50 cm. Preferably, the sump 320 and the liquid metal are at least 90% aluminum. The sump 320 can comprise a plurality of pockets 322 with one or more divisions 324 between the pockets 322, similar to a honeycomb. The pockets 322 can be angled to catch incident liquid metal. The pockets 322 can have openings 326 from about 0.5 $cm^2$ to about 4 $cm^2$. Preferably, the divisions 324 have a thickness no greater than 0.5 mm proximate to the openings 326 so the incident liquid metal does not splash off the divisions 324. The sump 320 can be roughened by a procedure such as abrasive cleaning. The abrasive cleaning process can comprise bead blasting, then removing the bead blast material using a distilled water ultrasonic wash, and then removing aluminum oxide or other contaminants using a standard wet chemical etch. The roughness allows deposited liquid metal to better fit in the pockets 322 and prevents flaking, thereby increasing the number of launches before replacing the sump 320.

The exit cavity 310 can be filled with a substantially non-reactive gas, such as nitrogen, which helps avoid aluminum oxidation. The exit cavity 310 can further comprise nitrogen injectors that fill the exit cavity 310 with nitrogen when the armature 102 is accelerated out of the system 100 to prevent an inrush of atmospheric gases.

Method

Figure 11:
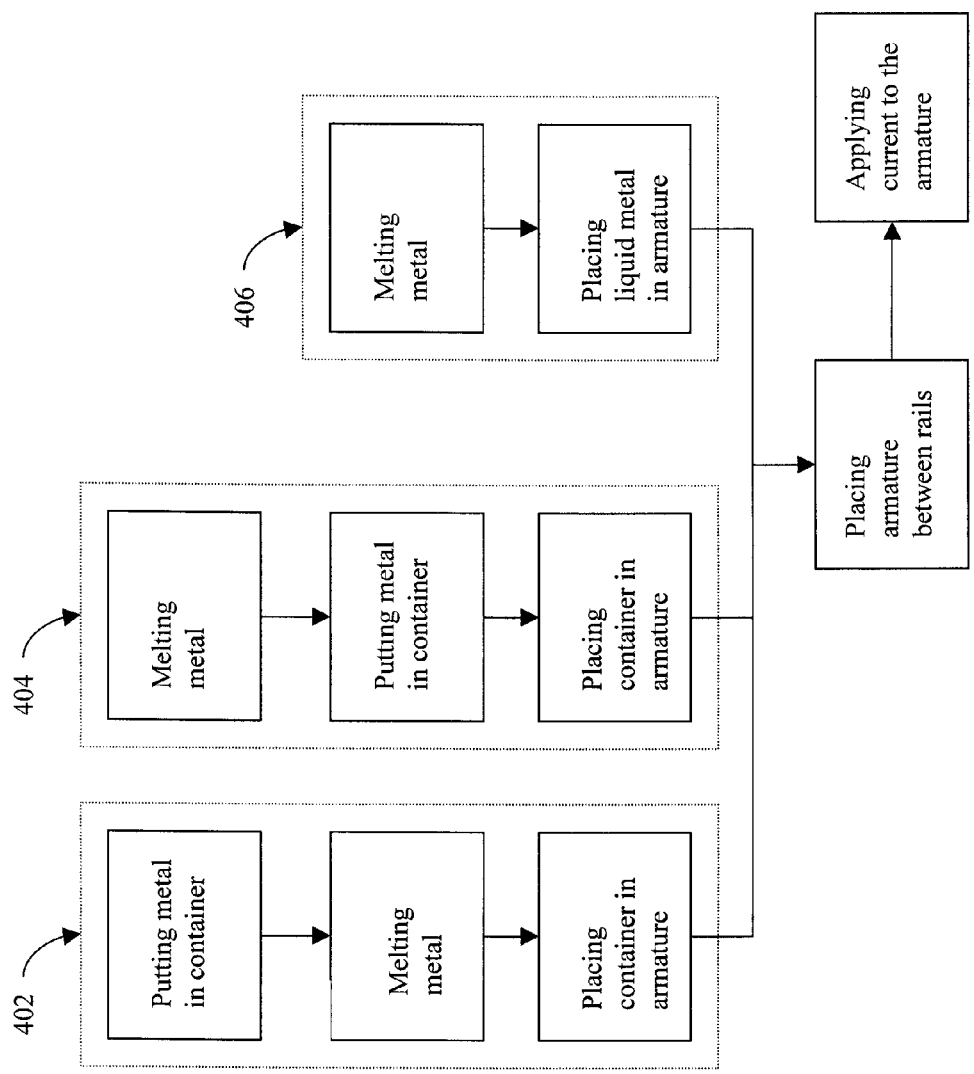
FIG. 11 is a schematic block diagram of a method of using one embodiment of the present invention.

To use the system 100, with reference to FIG. 11, a user first delivers liquid metal into the armature 102 through one of a variety of techniques. In a first technique 402, a user first places metal in the container 218, melts the metal inside the container 218, and then places the container 218 in the chamber 210. In a second technique 404, a user reverses the placing and the melting steps. In a third technique 406, a user melts the metal and then places the metal directly into the chamber 210. Once the liquid metal is in the armature, the user then places the armature 102 between the electrically conductive rails 106. The user can forcefully inject the armature so as to prevent the armature self-welding to the electrically conductive rails. One way to do this is with an impulse injection such as an air hammer. Alternative, a user can place the armature 102 between the electrically conductive rails 106 so that initially no conductive portion of the armature and the conductive rails are in contact and then place the liquid metal inside the armature 102 using one of the three techniques described above. The user then applies an electric current to the electrically conductive rails 106 and brings a portion of the conductive armature in direct contact with a portion of the conductive rail to accelerate the armature 102. The momentum of the armature 102 causes the liquid metal to be injected into at least a portion of the gap 204. Preferably, the liquid metal is then collected by the armature 102 and stored therein to prevent damage to the system 100.

Applications

The previously described embodiments of the present invention have many applications, including accelerating a projectile for mining and for non-explosive projectile launching in a weapons system. The embodiments can also be used to launch raw materials to supply a space station or moon colony, as well as to launch unmanned gliders.

Advantages

The previously described embodiments of the present invention have many advantages, including a larger railgun range due to the reduced contact resistance between the armature and the electrically conductive rails through the liquid metal. In addition, this reduced contact resistance is maintained over the entire rail length from gun breach to muzzle. There is less rail degradation due to the presence of nickel and aluminum on the electrically conductive rails and the liquid metal contact, as well as the lack of a Lorentz force induced sliding contact pressure between the armature and conducting rail. The latter is an improvement over state-of-the-art solid armature railguns that rely on excessive sliding contact pressure for reducing inter-electrode contact resistance. Further, the exit cavity attenuates the existing muzzle flash from launching a projectile from a railgun. This reduced muzzle flash allows for greater concealment from objects such as low-orbit satellites and environmental and personnel hazards in the vicinity of the railgun.

Although the present invention has been described in considerable detail with reference to the preferred versions thereof, other versions are possible. Therefore the scope of the appended claims should not be limited to the description of the preferred versions contained therein.

What is claimed is:

1. A method for accelerating an armature comprising the steps of:
   a. placing the armature between electrically conductive rails, there being a gap between at least a portion of the armature and the rails;
   b. applying electrical current to the rails to accelerate the armature in a forward direction; and
   c. introducing liquid metal comprising at least 90% aluminum into at least a portion of the gap.

2. The method of claim 1 wherein the liquid metal contains substantially only aluminum.

3. The method of claim 1 wherein the liquid metal is an aluminum alloy.

4. A method for accelerating an armature, said method comprising the steps of:
   placing the armature between electrically conductive rails, there being a gap between at least a portion of the armature and the rails;
   applying electrical current to the rails to accelerate the armature in a forward direction; and
   introducing liquid metal comprising at least 90% aluminum into at least a portion of the gap; wherein
   the armature has a forward side facing the forward direction and an opposed rear side, and the liquid metal is injected proximate to the rear side of the armature in the forward direction.

5. The method of claim 1 wherein the temperature of the introduced liquid metal is from about 700° C. to about 2200° C.

6. A method for accelerating an armature, said method comprising the steps of:
   placing the armature between electrically conductive rails, there being a gap between at least a portion of the armature and the rails;
   applying electrical current to the rails to accelerate the armature in a forward direction;
   introducing liquid metal comprising at least 90% aluminum into at least a portion of the gap;
   placing the metal in a container;
   heating the metal therein to melt the metal; and
   placing the container with the melted metal therein in the armature.

7. A method for accelerating an armature, said method comprising the steps of:
- placing the armature between electrically conductive rails, there being a gap between at least a portion of the armature and the rails:
- applying electrical current to the rails to accelerate the armature in a forward direction;
- introducing liquid metal comprising at least 90% aluminum into at least a portion of the gap;
- heating the metal to melt the metal;
- placing the melted metal in a container; and
- placing the container with the melted metal therein in the armature.

8. A method for accelerating an armature, said method comprising the steps of:
- placing the armature between electrically conductive rails, there being a gap between at least a portion of the armature and the rails;
- applying electrical current to the rails to accelerate the armature in a forward direction;
- introducing liquid metal comprising at least 90% aluminum into at least a portion of the gap;
- heating the metal to melt the metal; and
- placing the melted metal into the armature.

9. The method of claim 6 or 7 wherein the step of heating comprises applying induction heating to the metal.

10. A method for accelerating an armature, said method comprising the steps of:
- placing the armature between electrically conductive rails, there being a gap between at least a portion of the armature and the rails;
- applying electrical current to the rails to accelerate the armature in a forward direction;
- introducing liquid metal comprising at least 90% aluminum into at least a portion of the gap; and
- placing a projectile on the armature, wherein the projectile is accelerated by the armature.

11. A method for accelerating an armature comprising the steps of:
- a. placing the armature between electrically conductive rails, there being a gap between at least a portion of the armature and the rails;
- b. applying electrical current to the rails to accelerate the armature;
- c. introducing liquid metal into at least a portion of the gap; and
- d. collecting at least a portion of the introduced liquid metal with the armature.

12. The method of claim 1 wherein the liquid metal contains solid particles.

13. A method for accelerating an armature, said method comprising the steps of:
- placing the armature between electrically conducting rails, such that a gap is formed between at least a portion of the armature and the rails;
- applying electrical current to the rails to accelerate the armature; and
- introducing a large quantity of liquid metal into at least a portion of the gap; wherein
- the armature has a flat back surface, and the liquid metal is introduced in the vicinity of said back surface.

* * * * *